(12) United States Patent
Holloway (10) Patent No.: US 9,321,524 B2
(45) Date of Patent: Apr. 26, 2016

(54) BOGIE BEAM ARTICULATION MECHANISM

(71) Applicant: Goodrich Corporation, Charlotte, NC (US)

(72) Inventor: Gary Holloway, Ontario (CA)

(73) Assignee: Goodrich Corporation, Charlotte, NC (US)

( * ) Notice: Subject to any disclaimer, the term of this patent is extended or adjusted under 35 U.S.C. 154(b) by 191 days.

(21) Appl. No.: 14/258,884

(22) Filed: Apr. 22, 2014

(65) Prior Publication Data

US 2015/0298798 A1  Oct. 22, 2015

(51) Int. Cl.
*B64C 25/14* (2006.01)
*B64C 25/10* (2006.01)
*B64C 25/34* (2006.01)

(52) U.S. Cl.
CPC .............. *B64C 25/10* (2013.01); *B64C 25/14* (2013.01); *B64C 25/34* (2013.01)

(58) Field of Classification Search
CPC .. B64C 2025/345; B64C 25/22; B64C 25/10; B64C 25/34; B64C 25/14; B64C 2025/125; B64C 25/20; B64C 25/04; B64C 25/00; B64C 25/03
USPC ... 244/102 R, 100 R, 102 SS, 102 SI, 102 FP
See application file for complete search history.

(56) References Cited

U.S. PATENT DOCUMENTS

| 2,360,535 | A | * | 10/1944 | Ashton | F15B 15/261 244/102 SL |
| 2,360,759 | A | * | 10/1944 | Chalberg | B64C 25/20 244/102 R |
| 2,371,699 | A | * | 3/1945 | Martin | B64C 25/14 244/102 A |
| 2,399,846 | A | * | 5/1946 | Bachman | B64C 25/10 244/104 R |
| 2,487,548 | A | * | 11/1949 | Hawkins, Jr. | B64C 25/34 244/102 R |
| 2,497,489 | A | * | 2/1950 | Coursen | B64C 25/22 244/102 R |
| 2,504,458 | A | * | 4/1950 | Schmidt | B64C 25/26 244/102 SL |
| 2,630,990 | A | * | 3/1953 | Lindquist | B64C 25/20 244/102 R |
| 2,903,206 | A | * | 9/1959 | Rominger | B64C 25/26 244/102 R |
| 2,922,603 | A | * | 1/1960 | Smith | B64C 25/14 244/102 R |
| 2,930,552 | A | * | 3/1960 | Hartel | B64C 25/34 244/103 R |
| 2,939,655 | A | * | 6/1960 | Hartel | B64C 25/34 244/102 R |

(Continued)

FOREIGN PATENT DOCUMENTS

| FR | 2699885 | 7/1994 | | |
| FR | EP 0607721 A1 | * | 7/1994 | .............. B64C 25/34 |

(Continued)

OTHER PUBLICATIONS

Extended European Search Report dated Sep. 9, 2015 in European Application No. 15164079.4.

*Primary Examiner* — Brian M O'Hara
*Assistant Examiner* — Assres H Woldemaryam
(74) *Attorney, Agent, or Firm* — Snell & Wilmer, L.L.P.

(57) ABSTRACT

A bogie articulation mechanism is provided comprising, for example, a first torque link and a second torque link coupled for rotation about a pivot joint, the first torque link coupled to a bogie beam, a pitch trimmer having a first terminus and a second terminus, the first terminus coupled to the pivot joint, a bell crank having a pivot point, a first coupling point and a second coupling point, first coupling point couple to the second terminus of the pitch trimmer, and a reaction link coupled to the second coupling point of the bell crank.

12 Claims, 6 Drawing Sheets

(56) References Cited

U.S. PATENT DOCUMENTS

| | | | | |
|---|---|---|---|---|
| 2,958,400 A * | 11/1960 | Gilbert | B64C 25/60 188/287 |
| 2,963,246 A * | 12/1960 | Mitrovich | B64C 25/20 244/102 R |
| 2,967,033 A * | 1/1961 | Langdon | B64C 25/14 244/102 R |
| 2,982,500 A * | 5/1961 | Lucien | B64C 25/14 244/102 R |
| 3,083,937 A * | 4/1963 | Bainbridge | B64C 25/34 244/102 R |
| 3,086,733 A * | 4/1963 | Hartel | B64C 25/14 244/102 R |
| 3,322,376 A * | 5/1967 | Neilson et al. | B64C 25/34 244/100 R |
| 3,356,318 A * | 12/1967 | Livshits | B64C 25/34 244/102 R |
| 3,580,531 A * | 5/1971 | Bock | B64C 25/34 244/102 R |
| 3,762,670 A * | 10/1973 | Chillson | B64C 25/36 180/301 |
| 4,147,316 A * | 4/1979 | Kendall | B64C 25/10 244/102 R |
| 4,155,522 A * | 5/1979 | Sealey | B64C 25/10 244/102 R |
| 4,155,523 A * | 5/1979 | Morford | B64C 25/36 188/4 R |
| 4,189,117 A * | 2/1980 | Masclet | B64C 25/10 244/102 R |
| 4,199,119 A * | 4/1980 | Masclet | B64C 25/12 244/102 R |
| 4,328,939 A * | 5/1982 | Davies | B64C 25/12 244/102 R |
| 4,345,727 A * | 8/1982 | Brown | B64C 25/12 244/102 R |
| 4,392,622 A * | 7/1983 | McClaflin | B64C 25/10 244/102 A |
| 4,681,284 A * | 7/1987 | Veaux | B64C 25/14 244/102 R |
| 4,720,063 A * | 1/1988 | James | B64C 25/14 244/102 R |
| 4,770,372 A * | 9/1988 | Ralph | B64C 25/60 244/102 R |
| 4,892,270 A * | 1/1990 | Derrien | B64C 25/34 244/103 R |
| 4,907,761 A * | 3/1990 | Derrien | B64F 1/06 244/102 R |
| 4,984,755 A * | 1/1991 | Derrien | B64C 25/10 244/102 A |
| 5,029,775 A * | 7/1991 | Abramovitsh | B64C 25/20 244/102 A |
| 5,086,995 A * | 2/1992 | Large | B64C 25/34 244/102 R |
| 5,263,664 A * | 11/1993 | Derrien | B64C 25/66 244/102 A |
| 5,269,481 A * | 12/1993 | Derrien | B64C 25/18 244/102 A |
| 5,337,976 A * | 8/1994 | Derrien | B64C 25/14 244/102 A |
| 5,482,228 A * | 1/1996 | Hoshino | B64C 25/50 244/102 A |
| 6,131,852 A * | 10/2000 | Holloway | B64C 25/26 244/102 R |
| 6,824,100 B1 * | 11/2004 | Cheetham | B64C 25/20 244/102 R |
| 7,066,429 B2 * | 6/2006 | Mellor | B64C 25/10 244/102 R |
| 8,448,900 B2 * | 5/2013 | Mellor | B64C 25/34 244/102 A |
| 8,840,063 B2 * | 9/2014 | Lieven | B64C 25/20 244/102 A |
| 2003/0085321 A1* | 5/2003 | Reniau | F16C 11/068 244/100 R |
| 2003/0102406 A1* | 6/2003 | Chow | B64C 7/00 244/100 R |
| 2003/0111576 A1* | 6/2003 | Reniau | B64C 25/04 244/102 R |
| 2005/0011991 A1* | 1/2005 | Ducos | B64C 25/001 244/102 R |
| 2009/0108131 A1* | 4/2009 | Lavigne | B64C 25/12 244/102 A |
| 2009/0321560 A1* | 12/2009 | Luce | B64C 25/14 244/102 R |
| 2011/0180662 A1* | 7/2011 | Nardone | B64C 25/14 244/102 R |
| 2011/0198441 A1* | 8/2011 | Dubuisson | B64C 25/14 244/102 SS |
| 2012/0292442 A1* | 11/2012 | Simonneaux | B64C 25/001 244/100 R |
| 2014/0231584 A1* | 8/2014 | Ducos | B64C 25/001 244/100 R |

FOREIGN PATENT DOCUMENTS

| | | |
|---|---|---|
| GB | 643636 | 9/1950 |
| GB | 650547 | 2/1951 |
| WO | 2006071263 | 7/2006 |

* cited by examiner

BOGIE BEAM ARTICULATION MECHANISM

FIELD

The present disclosure relates to landing gear, and more particularly, to systems and methods for bogie beam articulation.

BACKGROUND

Landing gear supports an aircraft while the aircraft is on the ground. Bogie type landing gear may include a strut and a bogie beam which supports one or more pairs of wheels. The bogie beam may pivot relative to the strut. This may allow certain wheel pairs to touch ground prior to other wheel pairs during landing, and may allow all or a portion of all the wheels to remain on the ground as an aircraft body's center line changes angles with respect to the ground, for example, during takeoff or landing. After take-off, landing gear may be stowed by retracting the landing gear into a wheel well of an airframe.

SUMMARY

A bogie articulation mechanism is provided comprising, for example, a pitch trimmer having a first terminus and a second terminus, the first terminus coupled to an undercarriage comprising a bogie beam, a bell crank having a pivot point, a first coupling point and a second coupling point, first coupling point couple to the second terminus of the pitch trimmer, and a reaction link coupled to the second coupling point of the bell crank.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems for articulation of a bogie beam are disclosed. A bogie-type landing gear may comprise a bogie beam. Two or more axles may be mounted on the bogie beam. Each axle may bear one or more pairs of wheels. The bogie beam may be rotatably, for example pivotably coupled to a piston of the landing gear. It may be desirable for a bell crank to be used to facilitate bogie articulation in a bogie-type landing gear.

Figure 1:
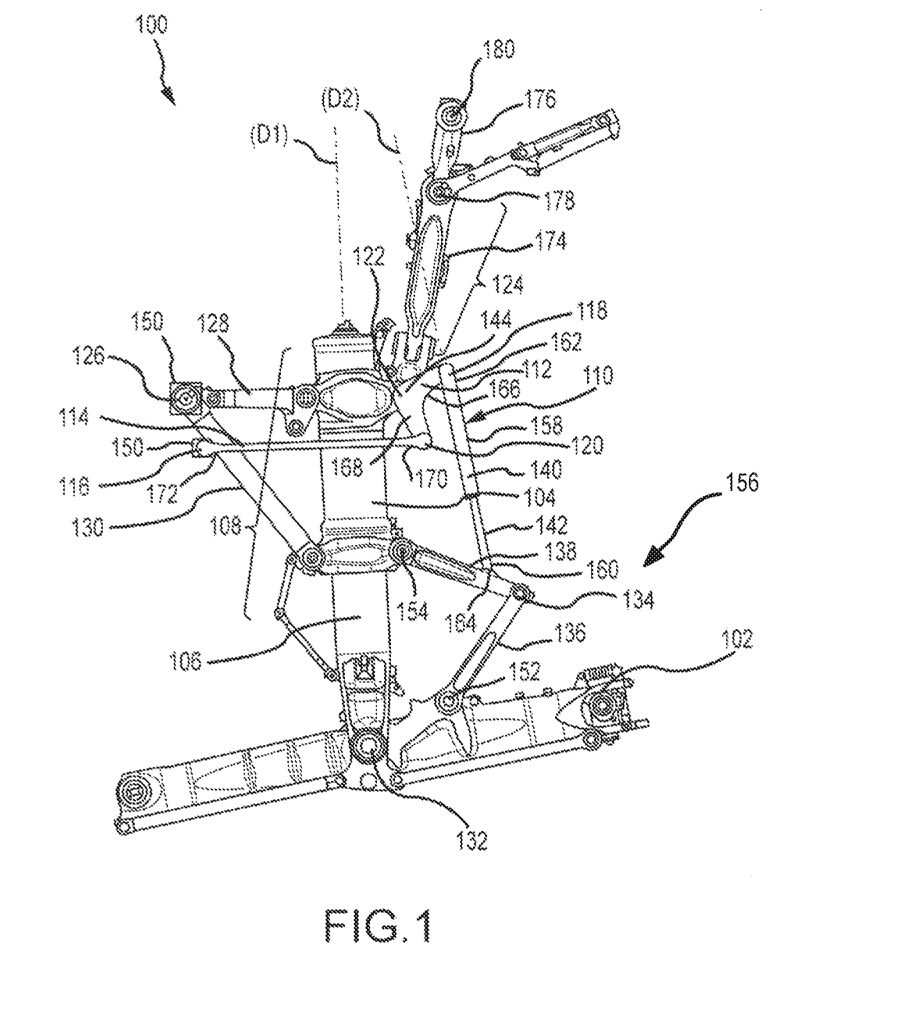
FIG. 1 illustrates, in accordance with various embodiments, a portion of a bogie-type landing gear in a deployed position.
Figure 2:
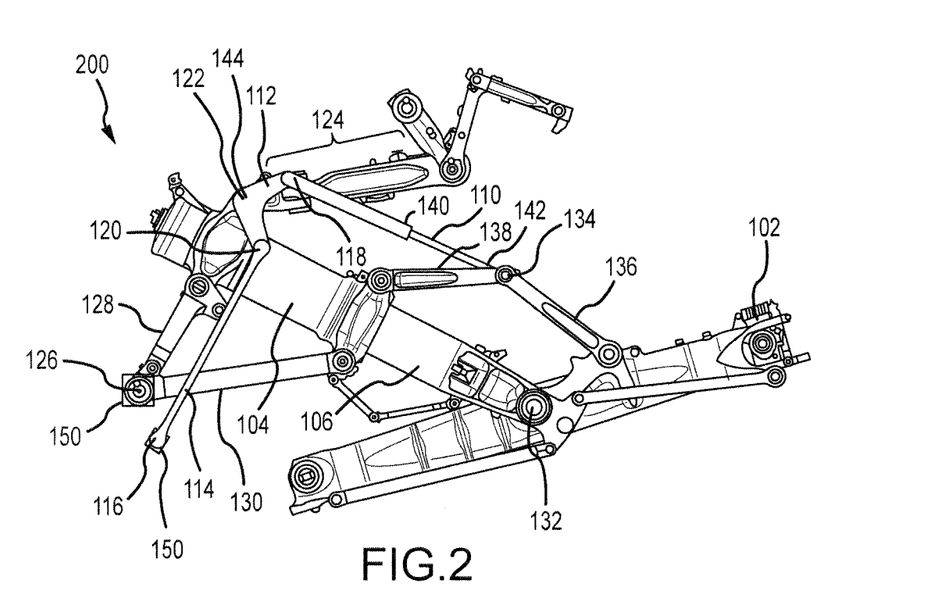
FIG. 2 illustrates, in accordance with various embodiments, a portion of a bogie-type landing gear in a partially deployed position.
Figure 3:
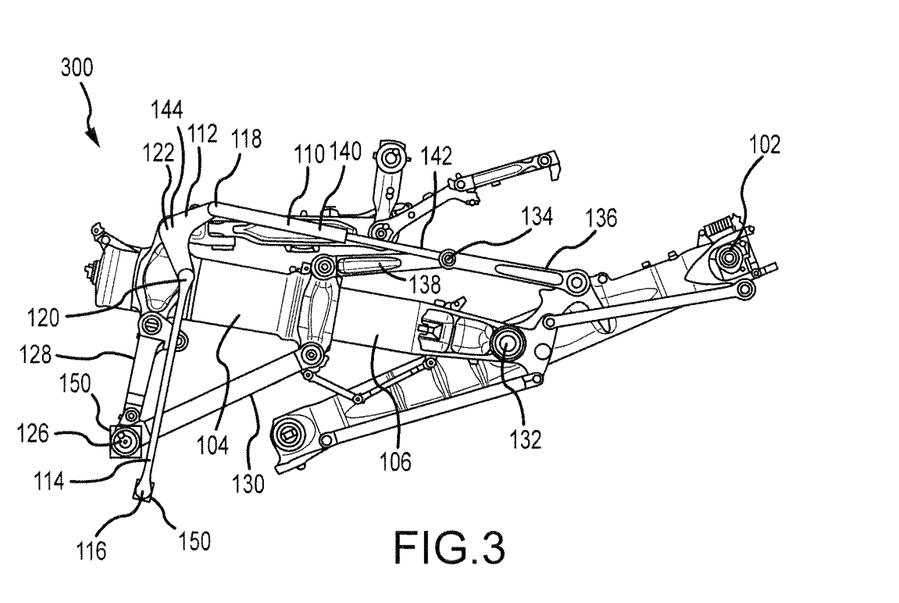
FIG. 3 illustrates, in accordance with various embodiments, a portion of a bogie-type landing gear in a retracted position.

Referring to FIGS. 1-3, a portion of a landing gear is illustrated in a deployed position 100, a partially retracted position 200 and a retracted position 300, respectively, according to various embodiments. As used herein, a landing gear in a deployed position may be suitable for landing of an aircraft. As used herein, a landing gear in a retracted or stowed position may be fully retracted within a wheel well of an airframe and be in a suitable position for flight. As used herein, a landing gear that is not in a deployed position or a retracted position may be in a partially retracted or partially deployed position. The partially retracted or partially deployed position may be intermediate between the retracted position and the deployed position. Movement of the landing gear between the deployed position and the retracted position is performed by rotation about an axis which is normal to the plane of the drawing sheet in FIG. 1. Unless stated otherwise or directly apparent from the description for the person skilled in the art, all rotation axis mentioned here may be about an axis normal to the plane of the drawing sheet. Unless stated otherwise or directly apparent from the description for the person skilled in the art, all links described here may be of fixed length.

Landing gear may comprise strut 108, bogie beam 102, and drag brace assembly 124. Strut 108 comprises strut housing 104 and piston 106. Piston 106 may be configured to telescopically move (i.e., translate within) within cylinder 104 along the strut longitudinal axis D1. Strut 108 may comprise various hydraulic systems to damp oscillation and/or to support the load presented by an aircraft while the aircraft is taking off, landing or on the ground. Bogie beam 102 may be configured to pivot relative to piston 106 at bogie pivot joint 132. Bogie pivot joint 132 may comprise any suitable pivot point configuration. For example, bogie pivot joint 132 may comprise a pin extending through a bushing and configured to rotate within the bushing. Bogie pivot joint 132 may comprise coated surfaces and/or lubricated surfaces to reduce friction during pivoting. This description of bogie pivot joint 132 may also apply to some other joints in various embodiments.

Bogie beam 102 may support one or more axles. The one or more axles may each have one or more wheels mounted for rotation. In that regard, when on the ground, the weight of the aircraft is transferred through the landing gear to the one or more axles and finally to the one or more wheels. Axles may be provided on either side of bogie pivot joint 132.

Lower torque link 136 is coupled to bogie beam 102. Lower torque link 136 is rotatably mounted to bogie beam at pivot joint 152. Lower torque link 136 is coupled to upper torque link 138 at pivot joint 134. In that regard, lower torque link 136 and upper torque link 138 are able to pivot with respect to each other about pivot joint 134. Upper torque link 138 is coupled to strut housing 104. Upper torque link 138 is rotatably mounted to strut housing 104 at pivot joint 154. Lower torque link 136 and upper torque link 138 may be configured to reduce the tendency of bogie beam 102 from rotating relative to strut 108 around the strut longitudinal axis D1. Bogie beam 102, upper torque link 138 and lower torque link 136 are part of what is designated here as undercarriage 156.

Pitch trim actuator 110 comprises piston/housing arrangement 158. The piston/housing arrangement 158 has a first terminus 160 and a second terminus 162. Piston/housing arrangement 158 comprises pitch trim piston 142 and pitch trim housing 140. Pitch trim piston 142 is configured to translate within pitch trim housing 140 along a longitudinal direction D2 of the piston/housing arrangement 158. Pitch trim actuator 110 may comprise a hydraulic system to control the relative position between pitch trim piston 142 and pitch trim housing 140 along the longitudinal direction D2. The relative position between the pitch trim piston 142 and the pitch trim housing 140 may be any position comprised between a shortest position and a longest position. The hydraulic system may also be used to damp relative translational motion between pitch trim piston 142 and pitch trim housing 140. In that regard, pitch trim actuator 110 may assist in damping the oscillation of bogie beam 102 about the bogie pivot joint 132. The first terminus 160 of piston/housing arrangement 158 may comprise a portion of pitch trim piston 142. The first terminus 160 of piston/housing arrangement 158 is coupled to upper torque link 138. Piston/housing arrangement 158 is rotatably mounted to upper torque link 138 at pivot joint 164.

The second terminus 162 of piston/housing arrangement 158 may comprise a portion of pitch trim housing 140. The second terminus 162 of piston/housing arrangement 158 is coupled to bell crank 122. Piston/housing arrangement 158 is rotatably mounted to bell crank 122 at first coupling point 118.

Bell crank 122 may comprise any suitable bell crank. Bell crank 122 may comprise pivot point 144, first coupling point 118 and second coupling point 120. Bell crank 122 may generally take an "L" shape. Stated another way, first coupling point 118 of the bell crank may be located on a first member 166 of bell crank 122 and second coupling point 120 of bell crank 122 may be located on a second member 168 of the bell crank. In that regard, first member 166 of the bell crank and second member 168 of the bell crank may be rigidly connected to one another at pivot point 144 of bell crank 122. First member 166 of the bell crank and second member 168 of the bell crank may be disposed at an angle of between about 80 degrees and about 100 degrees. For example, in various embodiments, first member 166 of the bell crank and second member 168 of the bell crank may be disposed at 90 degrees, as shown in FIG. 1.

Bell crank 122 may be mounted on strut housing 104 at pivot point 144. In that regard, bell crank 122 may be configured to pivot about pivot point 144 with respect to strut housing 104. Pivot point 144 may comprise any suitable pivot point configuration. For example, pivot point 144 may comprise a pin extending through a bushing and configured to rotate within the bushing. Pivot point 144 may comprise coated surfaces and/or lubricated surfaces to reduce friction during pivoting.

Reaction link 114 is coupled to second coupling point 120 of bell crank 122. Reaction link 114 may have a bell crank terminus 170 and an airframe terminus 172. Bell crank terminus 170 of reaction link 114 may be coupled to second coupling point 120 of bell crank 122. In that regard, reaction link 114 may be configured to pivot about bell crank 122 at second coupling point 120. Airframe terminus 172 of reaction link 114 may be coupled to airframe 150 at point 116. Airframe terminus 172 of reaction link 114 may be rotatably coupled to airframe 150 at point 116 Airframe 150 may comprise any portion of an airframe, for example, the portion of an airframe within a wheel well.

Drag brace assembly 124 is rotatably mounted on strut housing 104. For example, drag brace assembly 124 is rotatably mounted on strut housing 104 at pivot point 144. Drag brace assembly 124 comprises lower drag brace component 174 and upper drag brace component 176 which are coupled to one another. Lower drag brace component 174 is rotatably mounted on strut housing 104 at pivot point 144. Upper drag brace component 176 is rotatably mounted to lower drag brace component 174 at point 178. Further, upper drag brace component 176 is rotatably mounted to the airframe at point 180. Upper drag brace component 176 may rotate with respect to lower drag brace component 174 between an extended position and a collapsed position. A locking system 182 may be used to maintain upper drag brace component 176 and lower drag brace component 174 in the extended position as shown on FIG. 1.

Pintle 126 is also mounted to airframe 150. Pintle 126 is coupled to reaction link 130 and reaction link 128. Reaction links 130 and 128 are fixedly mounted on strut housing 104. A retraction actuator or other motive force may be operatively coupled to the landing gear and configured to rotate the landing gear about pintle 126 between deployed position 100 and retracted position 300. Locking system 182 may take an unlocked configuration allowing drag brace assembly 124 to take a collapsed position and to rotate about strut 108 at pivot point 144. For example, with reference to deployed position 100, partially retracted position 200 and retracted position 300, one may see that during retraction, the strut rotates about pintle 126, in this case in a counter-clockwise manner. During this motion, drag brace assembly 124 rotates with respect to strut 104, to provide a folding movement of the gear.

In that regard, landing gear retracts with respect to airframe 150 about an axis parallel to the rotation axis of bogie beam 102 with respect to strut 108.

In that regard, as landing gear is rotated about pintle 126, airframe 150 provides mechanical resistance to the movement of reaction link 114, which is connected to airframe 150 at point 116. Reaction link 114 exerts a force on second coupling point 120 of bell crank 122. This causes bell crank 122 to pivot with respect to strut housing 104 about pivot point 144. The rotation of bell crank 122 exerts a force on piston/housing arrangement 158 through first coupling point 118 of bell crank 122.

In that regard, and as shown with reference to deployed position 100, partially retracted position 200 and retracted position 300, one may see that during retraction, bogie beam 102 may pivot about bogie pivot joint 132 with respect to piston 106. This may be achieved by controlling the length of the piston/housing arrangement 158 during the retraction movement. In retracted position 300, as shown, a landing gear may take a retracted configuration and may remain entirely or nearly entirely within a wheel well. As shown, during retraction, bell crank 122 rotates in a clockwise direction.

The length of piston/housing arrangement 158 can be controlled during the retraction movement of the gear so that the orientation of bogie beam 102 with respect to the airframe 150 remains constant during the retraction movement of the gear, as is shown on the figures. This could be beneficial for aerodynamics. This could be obtained either using sensing devices to sense the orientation of bogie beam 102 and adapt the length of piston/housing arrangement 158 as a response to the measurement. Alternatively, this could be done by keeping the length of piston/housing arrangement 158 constant if the other kinematic points are suitably placed.

Actuation of the retraction actuator may cause the gear to move from its retracted position 300 to its extended position 100 where the gear is ready for landing. This could be achieved either by actual actuation of the retraction actuator, or by releasing actuation from the retraction actuator. If the landing gear could move to its deployed position by free fall, it would be beneficial for security landing. The phenomena which occur during this movement may be opposite to those occurring during retraction of the gear. The length of piston/housing arrangement 158 can be controlled in the landing-ready configuration of the strut to define a nominal angle of bogie beam 102 with respect to airframe 150 in this configuration. The length of piston/housing arrangement 158 in the deployed position of FIG. 1 can be controlled to be strictly lower than the longest length possible for piston/housing arrangement 158, in order to provide for a possible landing where the front wheels would touch the ground first.

At touch-down, bogie beam 102 would be caused to rotate with respect to strut 108 about bogie pivot joint 132, to move from a configuration where wheels of only one axle touch ground first to a configuration where wheels of all axles touch the ground. If the front wheels touch the ground first, a lengthening of piston/housing arrangement 158 may be needed. At or shortly after touch-down, strut 108 will begin to compress. To maintain the orientation of bogie beam 102 with respect to strut 108, a shortening of piston/housing arrangement 158 may be needed. The two phenomenon may be competing, and, depending of the weight and/or orientation in space of the airframe at touch-down, they may occur simultaneously, or either one of these two phenomena may start to occur first.

Later rotation of airframe 150 with respect to the ground and taxiing on the way while all wheels are on the ground may further affect the length of the piston/housing arrangement 158.

Above, various embodiments have been described using a pitch trim actuator. Alternatively, the pitch trimmer might not be a pitch trim actuator. The pitch trimmer may include a system to control the length of piston/housing arrangement 158 which may be a spring-based system, whereby piston/housing arrangement 158 may have a nominal length which is intermediate between its shortest and longest length, and defining a rest position of piston/housing arrangement 158. Length of piston/housing arrangement 158 may be changed away from the rest position, with springs urging piston/housing arrangement 158 toward its rest position.

Figure 4A:
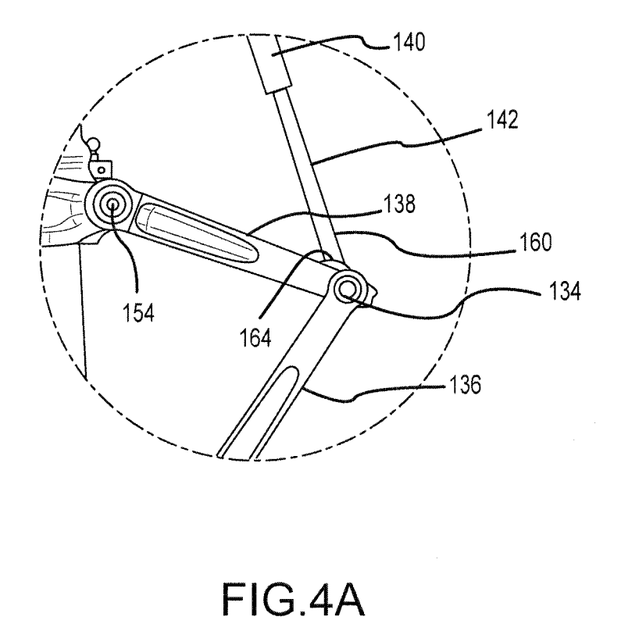
FIGS. 4A-4C illustrate, in accordance with various embodiments, a portion of a bogie-type landing gear.
Figure 4B:
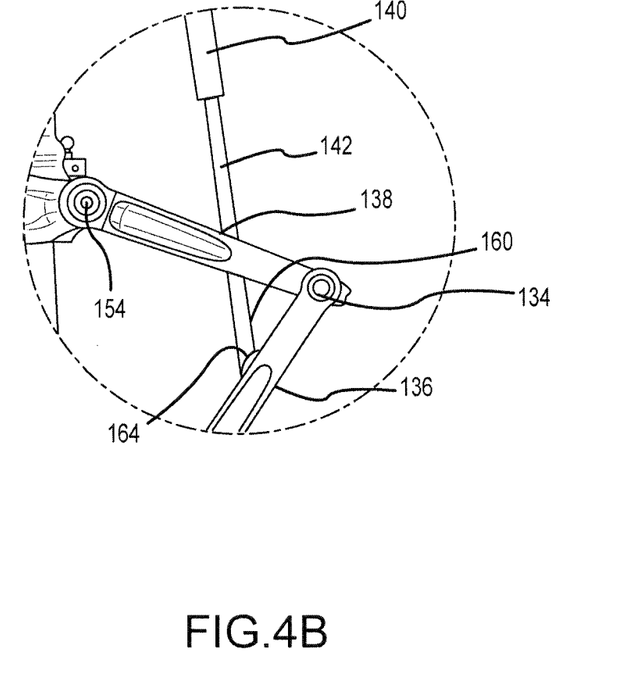
Figure 4C:
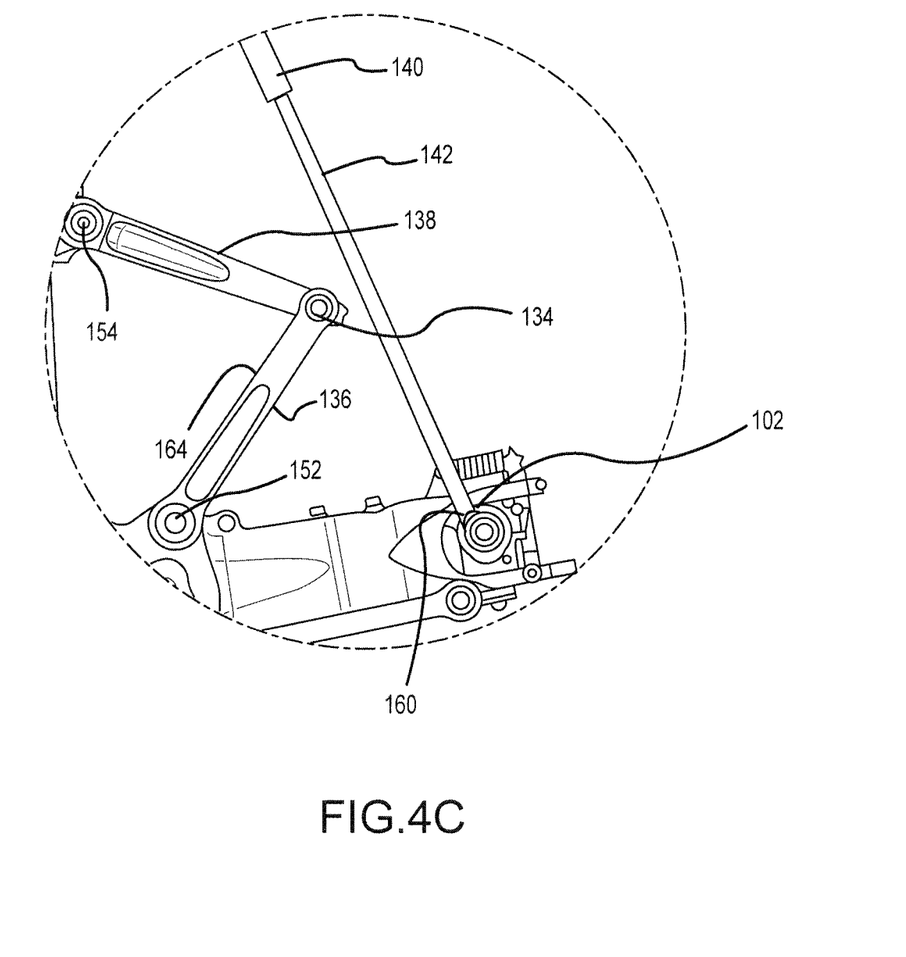

Above, various embodiments have been described with piston/housing arrangement 158 connected to upper torque link 138. Other connections to undercarriage 156 are possible for piston/housing arrangement 158, such as connection directly to bogie beam 102, to lower torque link 136, or to pivot joint 134. For example, with momentary reference to FIGS. 4A-4C, alternate mounting points for the first terminus 160 of piston/housing arrangement 158 onto undercarriage 156 are shown. FIGS. 4A-4C thus show a portion of FIG. 1, differing only in the mounting points for the first terminus 160 of piston/housing arrangement 158. In FIG. 4A, the first terminus 160 of piston/housing arrangement 158 is mounted to pivot joint 134. In FIG. 4B, the first terminus 160 of piston/housing arrangement 158 is mounted to lower torque link 136. In FIG. 4C, the first terminus 160 of piston/housing arrangement 158 is mounted to bogie beam 102.

Bell crank 122, lower torque link 136, upper torque link 138, reaction link 114, bogie beam 102, piston 106, cylinder 104, piston/housing arrangement 158, and various other components described herein may comprise any suitable material, such as titanium, aluminum, steel, stainless steel such as 300M stainless steel and/or chromium-nickel-tungsten martensitic alloy (also known as Greek Ascoloy).

In various embodiments, bogie beam 102 may be at a specified angle in order for the landing gear to retract properly, such as 1.5° with respect to the aircraft body, or between 1.3°-1.7° with respect to the aircraft body.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A bogie articulation mechanism comprising: a pitch trimmer having a first terminus and a second terminus, the first terminus coupled to an undercarriage comprising a bogie beam; a bell crank having a pivot point, a first coupling point and a second coupling point, the first coupling point coupled to the second terminus of the pitch trimmer; and a reaction link coupled to the second coupling point of the bell crank; wherein the reaction link has a bell crank terminus and an airframe terminus; wherein the bell crank terminus of the reaction link is coupled to the second coupling point of the bell crank; wherein airframe terminus of the reaction link is coupled to an airframe.

2. The bogie articulation mechanism of claim 1, wherein the pivot point of the bell crank is coupled to an outer portion of a strut.

3. The bogie articulation mechanism of claim 1, wherein the first coupling point of the bell crank is located on a first member of the bell crank and the second coupling point of the bell crank is located on a second member of the bell crank.

4. The bogie articulation mechanism of claim 3, wherein the first member of the bell crank and the second member of the bell crank intersect at the pivot point of the bell crank.

5. The bogie articulation mechanism of claim 4, wherein the first member of the bell crank and the second member of the bell crank are disposed at an angle of between about 80 degrees and about 100 degrees.

6. The bogie articulation mechanism of claim 1, wherein the strut comprises a piston and a housing, wherein the piston is configured to translate within the housing.

7. The bogie articulation mechanism of claim 6, wherein the piston is coupled to the bogie beam.

8. The bogie articulation mechanism of claim 1, wherein the pitch trimmer comprises a piston/cylinder arrangement with an actuator piston configured to translate within an actuator housing.

9. The bogie articulation mechanism of claim 8, wherein the pitch trimmer comprises a pitch trim actuator comprising a hydraulic system to damp translation between the pitch trim actuator piston and the pitch trim actuator housing.

10. The bogie articulation mechanism of claim 1, wherein the undercarriage comprises a first torque link and a second torque link coupled for rotation about a pivot joint, the first torque link rotatably coupled to a bogie beam, the second torque link rotatably coupled to the strut, the first terminus of the pitch trimmer being coupled to at least one of the first torque link, the second torque link and the bogie beam.

11. A landing gear comprising:
a strut,
an undercarriage comprising a bogie beam coupled for rotation to the strut,
the bogie articulation mechanism of claim 1 with the bell crank rotatably coupled to the strut at the pivot point of the bell crank, with the first terminus of the pitch trimmer rotatably coupled to the undercarriage, with the reaction link rotatably coupled to the airframe,
whereby rotation of the landing gear with respect to the airframe may cause rotation of the bogie beam with respect to the strut from a reaction imparted by the airframe to the reaction link.

12. The landing gear of claim 11, further comprising a pintle mounted to the airframe.

* * * * *